United States Patent [19]
Turenne et al.

[11] Patent Number: 5,445,788
[45] Date of Patent: Aug. 29, 1995

[54] METHOD OF PRODUCING ELEMENTS FROM POWDERS

[75] Inventors: Sylvain Turenne, St-Bruno; Paul-Émile Mongeon, Fabreville, both of Canada

[73] Assignee: National Research Council of Canada, Ottawa, Canada

[21] Appl. No.: 159,553

[22] Filed: Dec. 1, 1993

[51] Int. Cl.$^6$ ............................ B22F 1/00; B22F 3/00
[52] U.S. Cl. ................................ 419/42; 419/10; 419/14; 419/17; 419/19; 419/23; 419/32; 419/39; 419/58; 419/36
[58] Field of Search ............... 419/10, 14, 17, 19, 419/32, 23, 39, 55, 36, 42; 264/63

[56] References Cited
U.S. PATENT DOCUMENTS

| | | | |
|---|---|---|---|
| 3,929,476 | 12/1975 | Kirby, Jr. et al. | 419/27 |
| 4,582,682 | 4/1986 | Betz et al. | 419/68 |
| 5,028,367 | 7/1991 | Wei et al. | 264/63 |
| 5,190,898 | 3/1993 | Ter Maat et al. | 501/127 |

*Primary Examiner*—Donald P. Walsh
*Assistant Examiner*—John N. Greaves
*Attorney, Agent, or Firm*—Juliusz Szereszewski

[57] ABSTRACT

Complex-shaped parts can be produced from powders, for example metal-matrix composites, by injection molding using a mixture of the powders with a suitable binder. The binder must be removed from the powder mixture before the final thermal treatment of the so-called green part. The present invention proposes to remove the binder by surrounding a cast part with a layer of a particulate material and to subject the cast part to isostatic pressure through the surrounding layer which can thus act as an absorbent. The surrounding layer is removed after the isostatic pressing and the part can be subjected to sintering. The method is suitable for example for aluminum-ceramic powder mixtures.

14 Claims, 1 Drawing Sheet

METHOD OF PRODUCING ELEMENTS FROM POWDERS

FIELD OF THE INVENTION

This invention relates to producing elements, or parts, from powders, and particularly, to a method of separating at least in part a binder from a mixture thereof with particulate materials or material such as a metallic powder alone or in combination with a reinforcing ceramic powder.

BACKGROUND OF THE INVENTION

There are several production methods of metal matrix composites. One of the more economical ways is to combine ceramic reinforcement with molten metallic alloy by mixing action or by infiltration. Incorporation of ceramic particles in aluminum alloys can give composite materials with a reinforcement content practically up to about 20 vol.%. Even by using semi-solid processes, the particle content over 30 vol.% can not thus far be achieved due to the high viscosity of the semi-solid alloy with added particles. In applications where the coefficient of thermal expansion should be minimal, as for electronic packaging, the aluminum composites with 25 vol. % of reinforcement cannot match the coefficient of ceramic materials used as substrates in electronic circuits. Composites with a higher reinforcement content could be made by conventional powder metallurgy but the shapes available by this technology are quite limited.

To produce complex-shaped parts made of metals and/or ceramics, recent developments in powder injection molding and mold transfer technologies have made it possible to obtain near-net-shape parts of advanced materials at a significant production level. The powder injection molding step is carried out with a conventional equipment used in the polymer industry, employing a binder, usually a low-melting polymeric substance such as a wax. Before sintering the so-called green part, the binder has to be removed from the part. Various methods have been investigated to that effect but very few have been found efficient in terms of processing time (Lange et al, P/M Injection Molding Technique for Ceramic and Metal Parts, Powder Met. Int., 18 (6), 416-421, 1986 and Zhang et al, Powder Injection Molding of 17-4PH Stainless Steel, Proceedings of the Powder Injection Molding Symposium 1992, June 21-26, San Francisco, P.H. Booker, J. Gaspervich and R.M. German (eds.), American Powder Metallurgy Institute, 219-227). The binder removal methods suggested so far are: solvent extraction, thermal evaporation or degradation, and wicking (Aria et al, Influence of Process Variables on Debinding by Melt Wicking, Conference: Modern Developments in Powder Metallurgy. Vol. 18, Orlando, FLA, 403-416, 5-10 June 1988). The duration of these prior art debinding steps varies from about 2 to about 20 hours.

It should be noted that the fabrication of aluminum matrix composites with high reinforcement content by injection molding is not an easy task due to the oxide layer covering the aluminum powder. The packing pressure involved in the molding equipment is just high enough to cause the deformation of aluminum particles that facilitates sintering. When ceramic particles are added, the pressure is not sufficient to fill the gaps between the reinforcement particles because the wetting of the alloy on the ceramic is very poor.

SUMMARY OF THE INVENTION

According to one aspect of the invention, there is proposed a method of separating at least partly a binder from a mixture thereof with a powder or powders, the method comprising:

a) providing a mixture of the powder or powders with a suitable binder, b) molding the mixture into an element having a desired shape, c) surrounding the molded element with a contiguous layer of a porous particulate material which can absorb the binder, d) subjecting the molded element to an isostatic pressure through the surrounding particulate material layer in conditions sufficient to effect the absorption of a substantial amount of the binder by the particulate material, and e) separating the surrounding layer from the molded element.

Related to the above aspect of the invention is a method of producing a solid element from a powder or a mixture of powders, the method comprising, in addition to the above steps a-e, the step f) of processing the molded element, depleted of the binder, to a final form, for instance by sintering.

DETAILED DESCRIPTION OF THE INVENTION

In tests conducted to validate the invention, aluminum powders were used in combination with silicon carbide powders as a reinforcing component. Two waxes, paraffin and carnauba wax were used as polymeric binders.

Figure 1A:
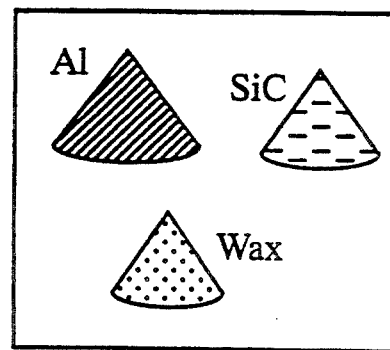
FIGS. 1A-1D illustrate the consecutive steps of the fabrication of a composite part using the method of the invention.

The method steps of the invention are illustrated schematically in FIGS. 1A-1D. First, SiC powder is mixed with the aluminum powder to achieve good distribution of both components (FIG. 1A). In the actual tests, the dry mixing was effected by means of a Spex mixer with nylon balls for 2 minutes. Mixed powders are then added to molten wax and agitated until a homogeneous mixture is obtained. Of course, this step is quite conventional.

Figure 1B:
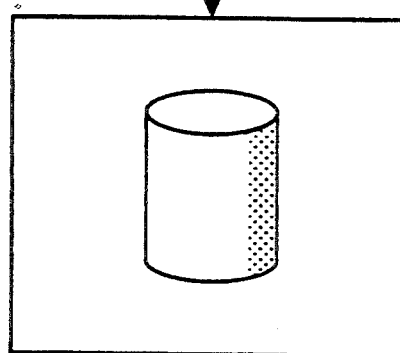
Figure 1C:
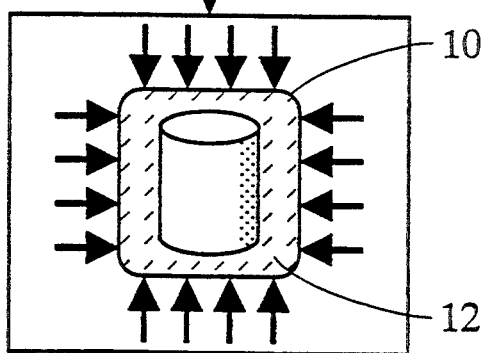

Molding of the powder/wax mixture, FIG. 1B, was effected simply by casting the viscous mixture which is at a temperature exceeding the melting point of the wax (binder) into a cavity (1 cm dia.) machined in an aluminum block. The cast part was easily removable from the mold and placed in a flexible container 10 with an amount of fine alumina particles so that a contiguous layer 12 of the alumina particles was formed around the cast composite part. The layer has to be relatively uniform in thickness. The material of the container should not degrade at the debinding temperature used. For a wax, latex (rubber) container is adequate. Some tests were conducted with the extraction of polyethylene as a binder using a polyimide container at 385° C. Next, the container was closed and exposed to an isostatic pressure, as per FIG. 1C, at a temperature over the melting point of the wax. The pressure is easily transmitted through the rubber container 10 and through the layer of the alumina powder 12 onto the molded composite part and causes wax extraction from the composite part into the alumina layer. The action of the isostatic pressure augments the capillary action of the alumina powder surrounding the composite part to effect the transfer of a substantial amount of the binder from the composite cast part to the surrounding alumina layer which acts as an absorbent. The isostatic pressure being distributed uniformly around the molded part translates into the absorption of the binder not being limited to the downward, gravity direction as in the case of wicking.

In the instant tests, described in more detail below, the debinding step lasted about 15 minutes and did not cause any major distortion of the parts tested. After debinding, the alumina layer with wax therein was found to be poorly bonded to the composite part and thus relatively easily separable therefrom. The shell formed by the infiltration of carnauba wax into the alumina powder was more difficult to break than the corresponding paraffin-containing shell, but both shells exhibited a poor adhesion to the part.

Figure 1D:
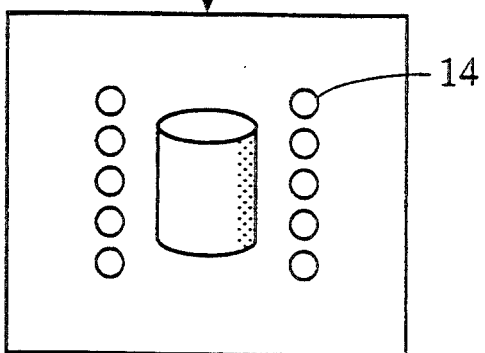

The final step d) of the fabrication process, FIG. 1D, was the sintering of the separated composite part (so-called green part) which was effected in a tubular furnace 14 under hydrogen atmosphere. Again, this step is conventional.

The details of the tests are presented below.

In the tests, it was attempted to fabricate aluminum matrix composites containing about 35 vol.% of SiC. In order to cast the powder mixture in the mold, about 40 vol.% of a binder was added to the dry powder mix. Two types of aluminum powder were evaluated, 20 $\mu$m and 15 $\mu$m particles, the latter more spherical and thus specifically designed for injection molding. The spherical shape helps to minimize the internal friction in the various molding processes and consequently reduces the viscosity of the mix. The use of such finer spherical powder may enable a reduction of the binder content which in turn may result in reduced shrinkage and fewer defects in the parts.

The SiC powder used corresponded to 600 grit (15 $\mu$m) polishing grade particles. The size distribution of such grade is narrow and adequate for composite parts.

The two waxes tested, paraffin and carnauba wax, have melting points of 57° and 86° C. respectively. The low melting point of the polymer binder is necessary when a latex (rubber) container is employed for debinding. It also helps in reaching a sufficiently low viscosity of the binder to promote the absorption of the binder by the surrounding absorbent (alumina) layer. On the other hand, it should be significantly lower than the sintering temperature of the powder or powders used to facilitate the debinding. The criteria of suitable binders are well known in the art.

The minimum isostatic pressure to achieve satisfactory debinding was 3.4 MPa for the paraffin and 10.3 MPa for the carnauba wax which is more viscous. However, in order to subsequently achieve satisfactory sintering, wherein the aluminum particles are in contact with each other, higher pressures were found necessary as evidenced by the data in Table 1. The binder-absorbent alumina powder had a particle size distribution of about 1 $\mu$m (polishing grade).

TABLE 1

Operating Conditions For Fabrication of Al—SiC Parts

| Test No. | Components (vol. %) | Vol. % of reinforc. | Debinding isost. pressure at 125° C. for 15 min (MPa) | Sintering time at 620° C. (min. |
|---|---|---|---|---|
| 1 | 40% paraffin 38% Al 20 $\mu$m 22% SiC 15 $\mu$m | 37 | 69 | 30 |
| 2 | 40% paraffin 38% Al 20 $\mu$m 22% SiC 15 $\mu$m | 37 | 310 | 60 |
| 3 | 35% paraffin 42% Al 15 $\mu$m 23% SiC 15 $\mu$m | 35 | 310 | 120 |
| 4 | 35% carnauba 42% Al 15 $\mu$m 23% SiC 15 $\mu$m | 35 | 310 | 120 |

It was found, as mentioned hereinabove, that the minimum debinding pressure, 3.4 MPa, was sufficient to extract virtually all the paraffin binder from the composite, but not sufficient to eliminate excess porosity from the composite prior to its sintering. Even the pressure of 69 MPa applied in the test 1 (Table 1) was not sufficient as the grain boundary was still very visible indicating moderate conditions of sintering. To obtain a better composite with less porosity, the isostatic pressure and the sintering time were increased in the second test. Also, the size of the aluminum powder was reduced in order to be comparable to the size of silicon carbide particles which otherwise have a tendency to agglomerate. The results of the tests 3–4 were entirely satisfactory.

A difference in the particle sizes of the absorbent material and the part (1 $\mu$m versus 15 $\mu$m) can be seen. There is a dependency between the fineness of the absorbent layer and its absorbing capacity.

In the above tests, the material of the absorbent layer did not diffuse into the cast part and vice versa to a significant degree.

It is reasonable to expect the invention to be applicable to non-metallic powders, as similar physical principles apply.

It is noted that the powder (material) of the absorbent contiguous layer should be chemically inert, at the debinding temperature, towards the powder the part is made of.

Tests were also conducted, although not reported herein in detail, with cast parts made of aluminum and ceramic fibers (alumina) as reinforcement. The results were successful which would suggest that the type of material of the part is not vital to the performance of the process of the invention.

It will also be appreciated by those in the art that an amount of routine experimentation may be necessary to implement the invention with different components and/or different product requirements.

We claim:

1. A method of separating at least partly a binder from a mixture thereof with a powder or a plurality of powders, the method comprising:
   a) molding the mixture into an element having a desired shape,
   b) surrounding the molded element with a contiguous layer of a particulate material which can absorb the binder,
   c) subjecting the molded element to an isostatic pressure through the surrounding particulate material layer in conditions sufficient to effect the absorption of at least a part of the binder by the particulate material, and d) separating the surrounding layer from the molded element.

2. A method of producing a solid element from a powder or a plurality of powders, comprising
   a) providing a mixture of the powder or powders with a suitable binder,
   b) molding the mixture of step a) into an element having a desired shape,
   c) surrounding the molded element with a contiguous layer of a particulate material which can absorb the binder,
   d) subjecting the molded element to an isostatic pressure through the surrounding particulate material layer in conditions sufficient to effect the absorption of at least a part of the binder by the particulate material,
   e) separating the surrounding layer from the molded element, and
   f) consolidating the molded element.

3. The method according to claim 1 wherein the plurality of powders comprises a metallic powder and a reinforcing ceramic powder.

4. The method according to claim 1 wherein the binder is a wax.

5. The method as described in claim 1 wherein the step c), is carried out at a temperature higher than the melting point of the binder and lower than the sintering temperature of the powder.

6. The method as defined in claim 1 wherein the particulate material is alumina.

7. The method according to claim 1 wherein the binder has a melting point which is significantly lower than the sintering temperature of the powder or powders.

8. The method according to claim 1 wherein the molded element with the surrounding particulate material layer is subjected to the isostatic pressure in a flexible container.

9. The method according to claim 2 wherein the binder is a wax.

10. The method according to claim 2 wherein the mixture of powders comprises a metallic powder and a reinforcing ceramic powder.

11. The method according to claim 2 wherein step f) is carried out by sintering.

12. The method as defined in claim 2 wherein the step d) is carried out at a temperature higher than the melting point of the binder and lower than the sintering temperature of the powder.

13. The method according to claim 2 wherein the particulate material is alumina.

14. The method according to claim 2 wherein the binder has a melting point which is significantly lower than the sintering temperature of the powder or powders.

* * * * *